*A. Barnes,*
Derrick.
No. 101,971. Patented Apr. 19, 1870.
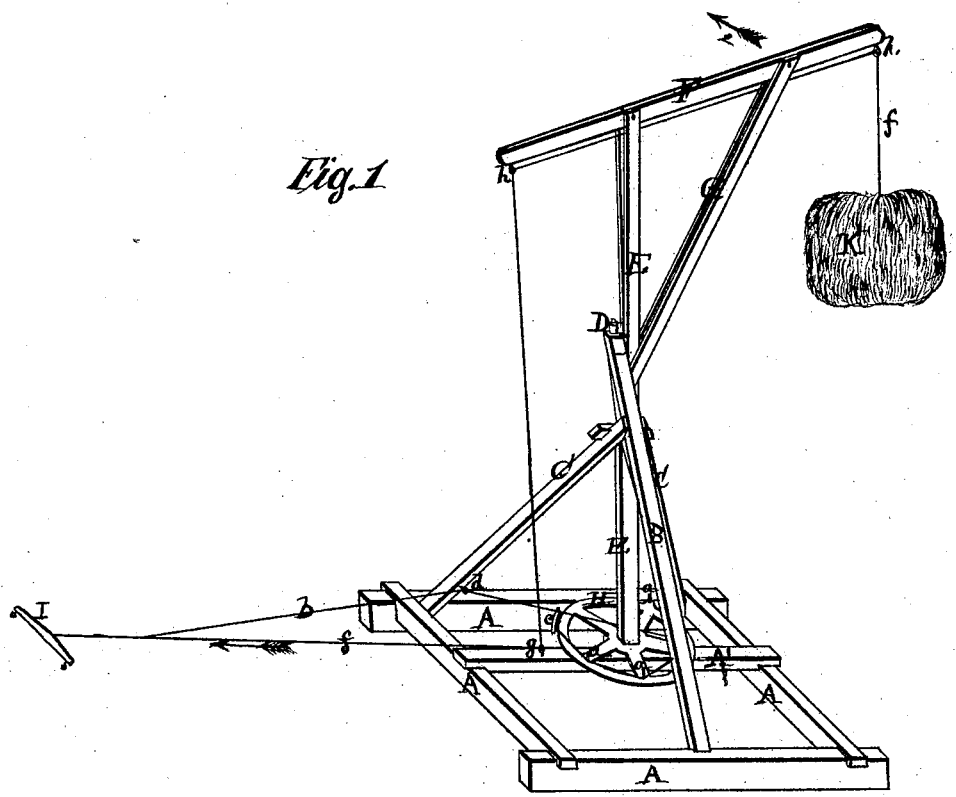
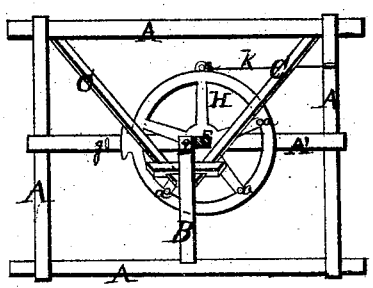
Witness:
John A. Silsner
L. N. Farwell
Inventor:
Alden Barnes.
By Farwell, Ellsworth & Co.
Attorneys.
N. PETERS, PHOTO-LITHOGRAPHER, WASHINGTON, D. C.

United States Patent Office.

ALDEN BARNES, OF BLOOMINGTON, ILLINOIS.

Letters Patent No. 101,971, dated April 19, 1870.

IMPROVEMENT IN HAY-DERRICKS.

The Schedule referred to in these Letters Patent and making part of the same.

*To all whom it may concern:*

Be it known that I, ALDEN BARNES, of Bloomington, in the county of McLean and State of Illinois, have invented a new and useful Improved Hay-Derrick; and I do hereby declare the following to be a full, clear, and exact description thereof, which will enable others skilled in the art to which my invention appertains to make and use the same, reference being had to the accompanying drawings forming part of this specification, in which—

Figure 1 is a perspective view of my improved hay-derrick, and

Figure 2 is a plan view of the same, showing the sweep removed.

Similar letters of reference indicate corresponding parts in the several figures of the drawings.

My invention relates to that class of hay-derricks by which the hay is elevated and swung over upon the load or stack by the same power, and has for its object to improve the construction of the same, whereby it shall be more simple and perfect in its operation, as will be hereinafter more fully described.

In the accompanying drawings—

A is the rectangular or quadrangular bed or base of the derrick, which supports the operating parts.

B is an inclined post, affixed at its lower end to one side of the bed A, and held in position by means of the inclined braces C C affixed to the opposite side of the bed frame, as shown.

The upper end of the post is hinged, as shown at D, to the upright E, whose lower end is pivoted to or stepped in the cross-bar A' of the bed-frame.

In order to hold the upright E in a vertical position, it is necessary that the post B be inclined at such an angle that its upper end shall be in a line perpendicular to the center of the cross-bar A' of the bed-frame, as shown in fig. 2.

The upper end of the upright E is provided with the derrick-arm F, extending upon each side of the same, and held firmly in position from the upright by means of the brace G.

Firmly secured to the lower end of the upright, in such a manner as to turn with it, is a horizontal wheel, H, provided with pins $a$, around which passes the swinging or turning rope $b$. This rope, one end being first fastened to one side of the wheel, as shown at $c$, fig. 1, passes around the wheel in contact with the pins $a$, and thence through an eye, $d$, affixed to one of the braces C to the whiffletree I. Instead of being attached directly to the whiffletree, it may be secured to the elevating rope $f$, as shown in fig. 1.

This latter rope, one end being attached to the whiffletree, passes through an eye, $g$, affixed to the frame, and thence to the derrick-arm, along the under side of which it passes through eyes $h$, the upright E, and brace G to the hay or other weight to be elevated.

The operation of my improved hay-derrick is as follows:

Power being applied to the whiffletree I, the rope $f$ is pulled in the direction of the arrow, fig. 1, and raises the hay K from the ground. When sufficiently elevated to be swung over the load or stack, the continued pull upon the rope $f$ brings the swinging rope $b$ into operation, which, acting upon the wheel H, turns the same to swing the hay in the direction of the arrow 2, over the load or stack, upon which it may be dumped by any suitable means.

The swinging rope remains slack or unstrained until the elevating rope has raised the hay to the proper height to be swung over upon the load, when it is brought into operation to swing the derrick, as previously described.

The swinging movement of the derrick is limited, by means of a cord or chain, $k$, connecting the wheel H with the base A, as clearly shown in fig. 2.

Having thus described my invention,

What I claim as new, and desire to secure by Letters Patent, is—

The improved hay-derrick, consisting of the base A, inclined post B, inclined braces C, pivoted and hinged upright E, arm F, wheel H, having pins $a$, the elevating and swinging ropes $f$ $b$, and the stop rope $k$, all constructed, arranged, and operating as herein shown and described.

ALDEN BARNES.

Witnesses:
JOHN T. H. HAMILTON,
L. WALDEN.